May 19, 1931. H. ZOELLY 1,806,515

STUFFING BOX FOR ROTATING SHAFTS

Filed April 2, 1928

Inventor
Heinrich Zoelly
By [signature]
Atty.

Patented May 19, 1931

1,806,515

UNITED STATES PATENT OFFICE

HEINRICH ZOELLY, OF ZURICH, SWITZERLAND

STUFFING BOX FOR ROTATING SHAFTS

Application filed April 2, 1928, Serial No. 266,620, and in Switzerland April 9, 1927.

This invention relates to stuffing boxes for rotating shafts and has reference to that kind of stuffing box which comprises a packing member rotating with the shaft and partaking in any axial displacement thereof and a second packing member which does not rotate but which also follows the axial movements of the shaft. In stuffing boxes of this kind the mutual location of the two packing members in the direction of the width of gap between their packing surfaces is determined by the shaft. Since both packing members partake in the axial displacements of the shaft, relative movements between said two members in an axial direction are prevented, so that the width of gap, in the axial direction between their packing surfaces can be made exceedingly small—indeed practically zero—whereby completely satisfactory working can be obtained even under these conditions.

The object of the present invention is to provide a stuffing box of the type above defined wherein axial thrust arising from the pressure of the medium to be retained and exerted on the non-rotating packing member is substantially avoided. To this end, according to the invention, the non-rotating packing member comprises a box-like portion which seats into a bore in the stuffing box casing so arranged that its diameter is less than the outermost diameter and greater than the innermost diameter of the co-operating packing surfaces of the two packing members which form at least one throttling gap disposed substantially at right angles to the shaft. If the non-rotating packing member, at least, be furnished with an annular labyrinth comb, the magnitude of the pressure due to the retained medium acting on that body in the gap can be regulated or determined by using such labyrinths in suitable number and form.

In the accompanying drawings two constructions in accordance with the invention are illustrated by way of example.

Figure 1:
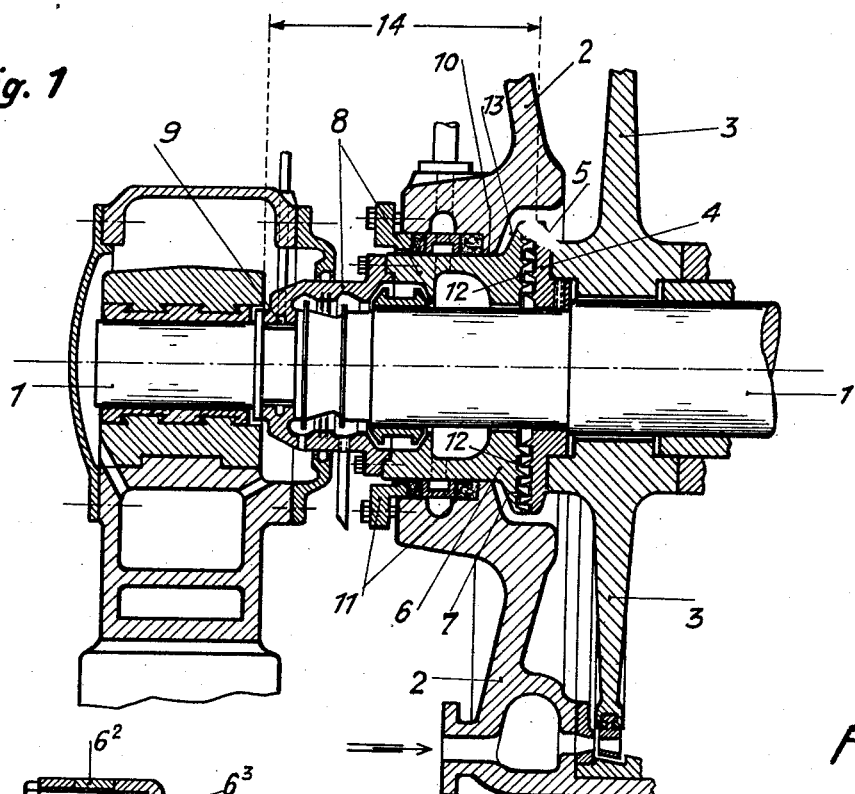
Fig. 1 shows, applied to a steam turbine, a stuffing box in which each of the two packing members has a packing surface arranged perpendicularly to the axis of the shaft and provided with labyrinths, so that the throttling gap lying between these surfaces lies substantially at right angles to the said shaft.

Referring to Fig. 1, the numeral 1 designates the turbine shaft which is to be packed and 2 the turbine casing, 3 indicating part of a rotor disc. The packing of the shaft 1 is effected by means of a labyrinth stuffing box comprising two packing members 4 and 6. The member 4, which is fast on the shaft 1, has a packing surface lying in a plane at right angles to the axis of the shaft and furnished with annular labyrinth combs 5. The member 6 has, for its part, a packing surface 12 lying perpendicular to the axis of the shaft and furnished with labyrinth combs 7. The labyrinth combs 5 and 7, together with the aforesaid packing surfaces of the members 4 and 6, lying perpendicular to the axis of the shaft, form a throttling gap which, itself is substantially at right angles to the shaft 1 and which is traversed by steam in a substantially radial direction. The packing member 6 is not rotatable and comprises a box-like portion 8 which, at its left hand end engages in an annular recess 9 in the shaft 1. The part 8 is accurately positioned in the axial sense between the radial surfaces of the annular recess 9, while in the radial direction a certain amount of play is provided between the said part 8 and the shaft 1. The packing member 6 is therefore compelled to partake in all the axial movements of the shaft. In this manner the combs 7 and the packing surface 12 of the member 6 are exactly located by the shaft 1 relatively to the combs 5 and the associated packing surface of the member 4, in the direction of the play in the labyrinth, that is to say, in the present instance, in the direction of the axis of the shaft. The box-like portion 8 of the packing member 6 finds a fluid-tight seating in a bore 10 of the casing 2. The diameter of this bore 10 is smaller than the outermost diameter and greater than the innermost diameter of the throttling gap formed by the cooperating packing surfaces of the two packing members 4 and 6. By employing such a diameter for the bore 10 it is possible to ensure that the throttled steam pressure acting on the packing surface 12 and its labyrinth combs 7 is so proportioned in relation to the unthrottled steam pressure acting on the surface 13 of the member 6 and to the atmospheric pressure acting thereon that the axial pressure acting in opposition upon the aforesaid surfaces produce practically no resultant axial thrust. The attainment of this object is facilitated by the presence of the labyrinth combs 7, since the steam pressure acting on the packing surface 12 and the said labyrinth combs 7 is dependent upon the number and form of such combs. Between the box-like part 8 of the non-rotating member 6 and the casing 2 there is provided a further stuffing box 11 with packing, for instance, a soft packing. In the stuffing box above described the determination of the position of the body 6 relatively to the body 4 in the direction of play in the labyrinth is effected solely through the agency of the shaft 1. Now since the distance of the place where the member 6 engages the shaft 1 from the throttling gap is relatively small and since, moreover, both the body 6 and the length of shaft 1 under consideration are exposed to substantially the same temperatures, the measurement 14 will be subjected to practically no variation when the turbine is running. Otherwise stated: practically no alteration of the position of the member 6 relatively to the member 4 will take place in the direction of the labyrinth play at the throttling gap of the packing. Consequently the throttling gap in the stuffing box above described remains unchanged and its width may therefore be reduced practically to zero. On the other hand, the play between the combs 5 and 7 in the radial direction may be as great as may be desired, so that the labyrinth packing is not in the least endangered by whipping of the shaft. Since the place where the box-like part 8 engages the recess 9 in the shaft 1 is located outside the turbine casing 2, it can be efficiently lubricated.

Figures 2, 3, 4:
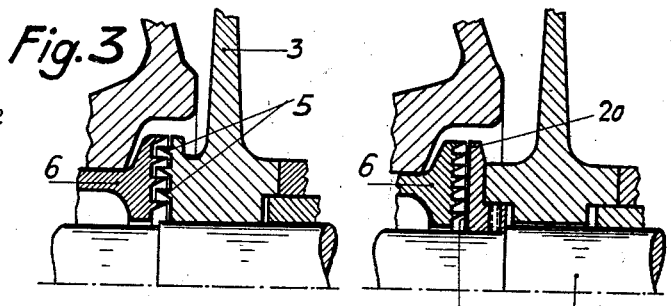
Fig. 2 shows a steam turbine stuffing box with two throttling gaps, arranged in series so far as their resistance to the efflux of steam is concerned and constituting a multiple labyrinth through which the steam flows outwards in substantially radial direction.
Figs. 3 to 5 show different modifications of details.

As shown in Fig. 3, the combs 5 may also be provided directly on a packing surface located on the rotor disc 3 and lying in a plane perpendicular to the axis of the shaft in which case the said rotor disc 3 forms one of the two packing members which bound the throttling gap.

Figures 5, 6:
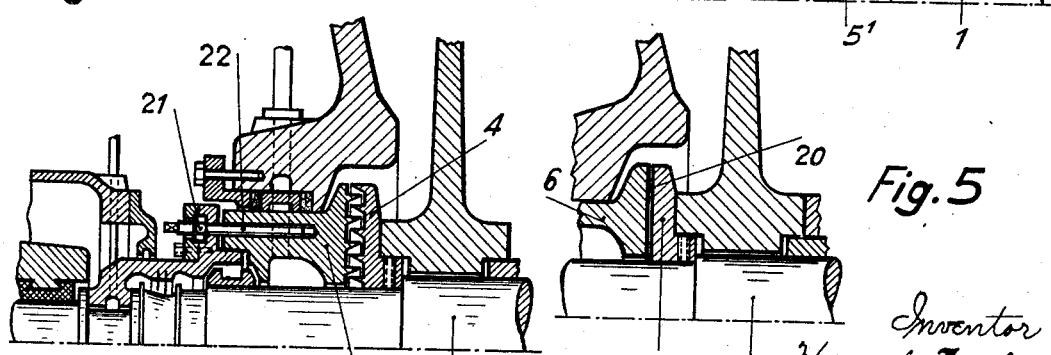
Fig. 6 shows a construction in which the non-rotating packing member is adjustable by hand relatively to the shaft to be packed.

Cases may arise in which it suffices to provide, as shown in Fig. 4, combs only on the member 6, so that then the throttling gap 20 is bounded on one side solely by a flat packing surface $5^1$ which lies perpendicular to the axis of the shaft. In many instances it will even be possible to secure a sufficiently powerful throttling action if the throttling gap 20 is bounded only by two flat packing surfaces provided, as shown in Fig. 5, on the packing members 4 and 6 and lying in planes perpendicular to the axis of the shaft. In such case, also, the axial play between the two packing surfaces may be made practically nil, that is to say, the two packing surfaces lying in places perpendicular to the axis of the shaft may be brought into contact with each other.

Fig. 2 shows the application of the invention to a stuffing box which comprises two throttling gaps arranged at right angles to the shaft and formed as a multiple labyrinth 15, 16, said gaps being arranged in series relationship as regards resistance to the efflux of steam.

In this example the non-rotating packing member which partakes in the axial movements of the shaft 1, is composed of three parts $6^1, 6^2, 6^3$ and the packing member which rotates with the shaft consists of two parts $4^1, 4^2$. Each of the parts $4^1, 4^2, 6^1, 6^2$ comprises a packing surface lying in a plane at right angles to the axis of the shaft and each of these surfaces is furnished with annular labyrinth combs 17 which serve to form the aforesaid multiple labyrinth 15, 16. Thus two throttling gaps are established each lying between two closely adjacent planes perpendicular to the axis of the shaft. In this example, in contradistinction to the first constructional form, the labyrinths are traversed by the steam in a substantially radial outward direction, that is to say in the direction in which the centrifugal force acts.

The packing member 6 may, moreover, be so formed and arranged as to be adjustable by hand axially of the shaft 1 in relation to the packing member 4 which rotates with said shaft. Such a construction is shown in Fig. 6 in which the packing member 6 is adjustable by hand by means of a screw-threaded bolt 22 cooperating with a nut 21 prevented from moving in the axial direction of said bolt 22. In such case the axial width of the throttling gap is adjustable to the desired extent whilst the device is in operation, but when such adjustment has been effected the width of said throttling gap will remain practically constant under all working conditions.

I claim:

1. A stuffing box for rotatable shafts, comprising in combination, a stuffing box casing, a packing member rotatable with the shaft and partaking in any axial displacement thereof and provided with at least one packing surface, and a non-rotatable packing member in operative connection with the shaft to follow the axial movements of the latter and provided with at least one packing surface cooperating with the packing surface of the rotatable packing member to form at least one throttling gap disposed substantially at right angles to the shaft, said non-rotatable packing member comprising a box-like portion which seats in a bore of said stuffing box casing, the diameter of which bore is less than the outermost diameter and greater than the innermost diameter of the cooperating packing surfaces of the two packing members.

2. A stuffing box for rotatable shafts, comprising in combination, a stuffing box casing, a packing member rotatable with the shaft and partaking in any axial displacement thereof and provided with at least one packing surface having annular labyrinth combs, and a non-rotatable packing member in operative connection with the shaft to follow the axial movements of the latter and provided with at least one packing surface having annular labyrinth combs cooperating with the labyrinth combs of the rotatable packing member to form at least one throttling gap disposed substantially at right angles to the shaft, said non-rotatable packing member comprising a box-like portion which seats in a bore of said stuffing box casing, the diameter of which bore is less than the outermost diameter and greater than the inner most diameter of the cooperating packing surfaces of the two packing members.

3. A stuffing box for rotatable shafts, comprising in combination, a stuffing box casing, a packing member rotatable with the shaft and partaking in any axial displacement thereof and provided with at least one packing surface, and a non-rotatable packing member in operative connection with the shaft to follow the axial movements of the latter and provided with at least one packing surface cooperating with the packing surface of the rotatable packing member to form at least one throttling gap disposed substantially at right angles to the shaft, said non-rotatable packing member comprising a box-like portion which seats in a bore of said stuffing box casing, the diameter of which bore is less than the outermost diameter, and greater than the innermost diameter of the cooperating packing surfaces of the two packing members which bound the throttling gap, and said non-rotatable packing member having a surface connecting the part which enters the bore of the stuffing box casing to its outermost diameter and which surface is exposed to the full pressure of the medium to be retained, so that the axial thrust on this packing member due to the pressure prevailing in the throttling gap, is thereby balanced.

4. A stuffing box for rotatable shafts, comprising a non-rotatable casing connected to the shaft to partake of axial movement of the shaft on which it is mounted, a rotatable packing member on the shaft and co-operating with the casing to form a radial leakage gap, means to adjust the non-rotatable casing with respect to the rotatable packing member to vary the size of said gap, said non-rotatable casing having a pressure surface subjected to the pressure to be retained to balance the axial thrust on this member due to pressure prevailing in the gap.

In testimony whereof I have signed my name to this specification.

HEINRICH ZOELLY.